United States Patent Office 3,095,430
Patented June 25, 1963

3,095,430
CATALYTIC MASSES FOR THE OXIDATION OF NAPHTHALENE TO 1:4-NAPHTHOQUINONE
Walter Wettstein, Muenchenstein, Switzerland, assignor to Ciba Limited, Basel, Switzerland
No Drawing. Filed Jan. 26, 1959, Ser. No. 788,773
Claims priority, application Switzerland Feb. 5, 1958
3 Claims. (Cl. 260—396)

In the catalytic oxidation of naphthalene in the gaseous phase, to phthalic anhydride in the presence of a catalyst, which contains vanadium pentoxide on a silicic acid carrier, such as precipitated silicic acid, silica gel, kieselguhr or the like, and also contains a substantial amount of potassium sulfate, potassium bisulfate or potassium pyrosulfate, it is known that small amounts (a few percent calculated on the naphthalene used) of 1:4-naphthoquinone are obtained in addition to phthalic anhydride as the main product. It has therefore been concluded that this reaction proceeds by way of naphthoquinone as an intermediate product.

The present invention is based on the observation that the catalyst carrier plays a very important part in the conversion of the 1:4-naphthoquinone intermediately formed, and that the further oxidation of the naphthoquinone to phthalic anhydride can be very strongly retarded by using, instead of silicic acid, stannic oxide as carrier for the vanadium pentoxide.

In this manner naphthalene can be converted by catalytic oxidation in the gaseous phase into 1:4-naphthoquinone in excellent yield.

Accordingly, the present invention provides catalytic masses for the oxidation of naphthalene in the gaseous phase to 1:4-naphthoquinone, which comprises vanadium pentoxide or a compound convertible into vanadium pentoxide under the action of heat, stannic oxide or a compound convertible into stannic oxide by the action of heat, and an alkali metal bisulfate or alkali metal pyrosulfate, advantageously potassium bisulfate or potassium pyrosulfate. The proportion of the stannic oxide is advantageously more than 50%, and preferably 100–200%, calculated on the $V_2O_5$.

The catalytic masses of this invention advantageously contain, in addition to the alkali metal bisulfate or pyrosulfate, a neutral salt which is stable under the conditions of the catalysis, such as an alkali metal sulfate, especially potassium sulfate.

The proportion of the potassium bisulfate or potassium pyrosulfate is advantageously 100–200% calculated on the $V_2O_5$. The proportion of the potassium sulfate is advantageously the same as that of the potassium bisulfate or pyrosulfate, that is to say preferably a total of 200–400%, calculated on the $V_2O_5$.

The catalytic mass may also contain an inert carrier, such as ground pumice, corundum or the like. The carrier mainly has the mechanical function of regulating the porosity of the catalyst particles, and therefore the proportion thereof must be greater the higher the proportion of the fusible constituents of the mixture, $V_2O_5$, $K_2SO_4$ and $KHSO_4$, relatively to the proportion of infusible $SnO_2$. The porosity of the catalyst particles can, of course, also be influenced by adding organic substances that can be removed before the catalysis, such as graphite, urea or the like.

For use in the catalysis the catalyst must be in a particulate form, the particle size varying depending on the type of reactor used. For reactors in which a fluidised bed is formed the particle size may range from about 0.1 to 1 millimeter and for those in which static beds are used the particle size may range from 1 to about 10 millimeters.

The particulate catalyst can be produced from a finely ground mixture of the constituents in the usual manner, for example, by direct tableting of the pulverulent mixture, or by making the mixture into a paste with a suitable liquid, such as water or an alcohol or a mixture of these liquids, and moulding the paste in an extrusion press or through a perforated plate. It can also be carried out by granulation on a rotating table with the periodic addition of the liquid and powder, or the like.

In use the catalytic masses of this invention lead to considerable quantities of 1:4-naphthoquinone, even when the naphthalene undergoes substantially complete conversion. However, the yield of 1:4-naphthoquinone calculated on the naphthalene that undergoes reaction is greater the greater the proportion of non-reacted naphthalene present in the final product. When the conversion of the naphthalene is incomplete the use of the catalytic masses of this invention lead to 1:4-naphthoquinone as the main product with only small amounts of phthalic anhydride.

It is therefore especially advantageous to carry out the catalytic oxidation of naphthalene in the gaseous phase to naphthoquinone by a cyclic process in which the reaction conditions, such as the velocity of the gas stream, temperature, etc., are so chosen that the issuing gases contain unreacted naphthalene, and a part of the gases containing this naphthalene is returned to the process. Alternatively, the naphthalene present in the gaseous mixture may be recovered for reuse, after separation of the oxidation products, which consist principally of naphthoquinone and phthalic anhydride, by freezing.

The following examples illustrate the invention, the parts being by weight unless otherwise stated and the relationship of parts by weight to parts by volume being the same as that of the kilogram to the liter:

*Example 1*

48 parts of metastannic acid, obtained by taking up granulated tin in nitric acid having a specific gravity of 1.32, are ground in a rod mill for 1½ hours with 12 parts of ammonium metavanadate, 30 parts of potassium bisulfate, 30 parts of potassium sulfate, 20 parts of pumice powder and 2 parts of graphite, then 10 parts of urea are added and the whole is ground for a further 15 minutes.

The mixture is pressed into cylindrical tablets having a diameter of 5 mm. and a height of 5 mm. The tablets are heated in the course of about 3 hours in a current of air to 460° C., and are further roasted at that temperature for 2 hours.

80 parts by volume of the catalytic mass so obtained are charged into a catalyst furnace. The catalyst tube is heated by means of a melt of potassium nitrate to 375° C., and there are passed through the tube, per hour, 20,000 parts by volume of air containing 0.676 part of naphthalene. The issuing gaseous mixture is cooled to about 30° C., whereby 0.696 part of solid condensate separates out per hour. By analysis the condensate yields 0.315 part of phthalic anhydride and 0.236 part of 1:4-naphthoquinone.

*Example 2*

48 parts of metastannic acid, 42 parts of ammonium metavanadate, 30 parts of potassium bisulfate, 30 parts of potassium sulfate and 40 parts of pumice powder and 2 parts of graphite are ground for 1½ hours, then 12 parts of urea are added, and the whole is further ground for 15 minutes.

The mixture is compressed into tablets measuring 5 x 5 millimeters and roasted as described in Example 1, and used in a catalyst furnace for the gas phase oxidation of naphthalene in the following manner:

Over 80 parts by volume of the above catalyst tablets are passed at 362° C., per hour, 20,000 parts by volume of air containing 0.600 part of naphthalene. The issuing gases are cooled to 36° C. and leave behind 0.745 part of condensate per hour. The condensate contains 0.101 part of phthalic anhydride and 0.363 part of 1:4-naphthoquinone.

*Example 3*

56 parts of metastannic acid, 34 parts of ammonium metavanadate, 38 parts of potassium bisulfate, 35 parts of potassium sulfate, 0.7 part of benzoic acid, and 32 parts of urea are ground in the manner described above, and formed on a granulating table into globular granules of 2–5 mm. diameter by spraying methanol of 70% strength on to the mixture. The granules are dried at 90° C. and slowly heated to 400° C. in a current of air.

Over 80 parts by volume of the resulting catalytic mass are passed at 380° C. per hour, 20,000 parts by volume of air containing 0.827 part of naphthalene. The issuing gaseous mixture is cooled to 50° C. and leaves behind 0.734 part of condensate per hour, which contains 0.205 part of phthalic anhydride and 0.348 part of 1:4-naphthoquinone. When the gaseous mixture leaving the separator at 50° C. is further cooled to 25° C. a further 0.120 part of condensate is obtained, which consists mainly of napthalene.

What is claimed is:

1. A process for the catalytic oxidation in the gaseous phase of naphthalene to 1:4-naphthoquinone, wherein a mixture of naphthalene with air is passed under atmospheric pressure, at a temperature of about 360 to 380° C., and at a flow rate of naphthalene-containing air of about 20,000 parts by volume per hour, the naphthalene being present in the range from about 0.600 to about 0.827 part by weight per 20,000 parts by volume of air, over a member selected from the group consisting of
   (A) a catalyst consisting essentially of
      (a) vanadium pentoxide,
      (b) more than 50 percent by weight, calculated on the vanadium pentoxide, of stannic oxide, and
      (c) 100 to 200 percent by weight, calculated on the vanadium pentoxide, of a member selected from the group consisting of an alkali metal bisulfate and an alkali metal pyrosulfate;
   (B) a catalyst consisting essentially of
      (a) vanadium pentoxide,
      (b) more than 50 percent by weight, calculated on the vanadium pentoxide, of stannic oxide.
      (c) 100 to 200 percent by weight, calculated on the vanadium pentoxide, of a member selected from the group consisting of an alkali metal bisulfate and an alkali metal pyrosulfate; and
      (d) a chemically inert silicon compound as carrier;
   (C) a catalyst consisting essentially of
      (a) vanadium pentoxide,
      (b) more than 50 percent by weight, calculated on the vanadium pentoxide, of stannic acid,
      (c) 100 to 200 percent by weight, calculated on the vanadium pentoxide, of a member selected from the group consisting of an alkali metal bisulfate and an alkali metal pyrosulfate; and
      (d) an alkali metal sulfate; and
   (D) a catalyst consisting essentially of
      (a) vanadium pentoxide,
      (b) more than 50 percent by weight, calculated on the vanadium pentoxide, of stannic oxide,
      (c) 100 to 200 percent by weight, calculated on the vanadium pentoxide, of a member selected from the group consisting of an alkali metal bisulfate and an alkali metal pyrosulfate;
      (d) an alkali metal sulfate, and
      (e) a chemically inert silicon compound as carrier.

2. A process for the catalytic oxidation in the gaseous phase of naphthalene to 1:4-naphthoquinone, wherein a mixture of naphthalene with air is passed under atmospheric pressure, at a temperature of about 360 to 380° C., and at a flow rate of naphthalene-containing air of about 20,000 parts by volume per hour, the naphthalene being present in the range from about 0.600 to about 0.827 part by weight per 20,000 parts by volume of air, over a catalyst consisting essentially of
   (a) vanadium pentoxide,
   (b) more than 50 percent by weight, calculated on the vanadium pentoxide, of stannic oxide,
   (c) 100 to 200 percent by weight, calculated on the vanadium pentoxide, of an alkali metal bisulfate,
   (d) 100 to 200 percent by weight, calculated on the vanadium pentoxide, of an alkali metal sulfate, and
   (e) a chemically inert silicate as carrier, the stannic oxide and the alkali metal pyrosulfate each being present in the catalyst in an amount of 100 to 200 percent by weight calculated on the $V_2O_5$-content, and the alkali metal sulfate being present in the catalyst in an amount of 200 to 400 percent by weight, calculated on the $V_2O_5$-content.

3. In a process for the catalytic oxidation in the gaseous phase of naphthalene to 1:4-naphthoquinone, wherein a mixture of naphthalene and air is passed over a heated catalyst at a flow rate whereby incomplete conversion of the naphthalene results, the improvement wherein the catalyst is a member selected from the group consisting of
   (A) a catalyst consisting essentially of
      (a) vanadium pentoxide,
      (b) more than 50 percent by weight, calculated on the vanadium pentoxide, of stannic oxide, and
      (c) 100 to 200 percent by weight, calculated on the vanadium pentoxide, of a member selected from the group consisting of an alkali metal bisulfate and an alkali metal pyrosulfate;
   (B) a catalyst consisting essentially of
      (a) vanadium pentoxide,
      (b) more than 50 percent by weight, calculated on the vanadium pentoxide, of stannic oxide,
      (c) 100 to 200 percent by weight, calculated on the vanadium pentoxide, of a member selected from the group consisting of an alkali metal bisulfate and an alkali metal pyrosulfate; and
      (d) a chemically inert silicon compound as carrier;
   (C) a catalyst consisting essentially of
      (a) vanadium pentoxide,
      (b) more than 50 percent by weight, calculated on the vanadium pentoxide, of stannic oxide,
      (c) 100 to 200 percent by weight, calculated on the vanadium pentoxide, of a member selected from the group consisting of an alkali metal bisulfate and an alkali metal pyrosulfate; and
      (d) an alkali metal sulfate; and
   (D) a catalyst consisting essentially of
      (a) vanadium pentoxide,
      (b) more than 50 percent by weight, calculated on the vanadium pentoxide, of stannic oxide,
      (c) 100 to 200 percent by weight, calculated on the vanadium pentoxide, of a member selected from the group consisting of an alkali metal bisulfate and an alkali metal pyrosulfate;
      (d) an alkali metal sulfate, and
      (e) a chemically inert silicon compound as carrier.

References Cited in the file of this patent

UNITED STATES PATENTS 1,692,126    Jaeger _____ Nov. 20, 1928

(Other references on following page)

UNITED STATES PATENTS

| | | | |
|---|---|---|---|
| 1,844,387 | Jaeger | | Feb. 9, 1932 |
| 1,844,388 | Jaeger | | Feb. 9, 1932 |
| 1,844,390 | Jaeger | | Feb. 9, 1932 |
| 1,872,956 | Jaeger et al. | | Aug. 23, 1932 |
| 1,909,355 | Jaeger | | May 16, 1933 |
| 2,863,879 | Tribit et al. | | Dec. 9, 1958 |
| 2,863,884 | Tribit et al. | | Dec. 9, 1958 |
| 3,012,043 | Dowden et al. | | Dec. 5, 1961 |

OTHER REFERENCES

Maxted: J. Soc. Chem. Ind. Trans., vol. 47, pp. 101T–105T (1928).

Green: J. Soc. Chem. Ind. Trans., vol. 51, pp. 159T–163T (1932).

Chowdhury et al.: J. Indian Chem. Soc., vol. 14, pp. 633–637 (1937).

Fieser and Fieser: Advanced Organic Chemistry, p. 853 (Reinhold) (1961).